(12) United States Patent
Ono

(10) Patent No.: US 9,469,210 B2
(45) Date of Patent: Oct. 18, 2016

(54) VEHICLE

(71) Applicant: TOYOTA JIDOSHA KABUSHIKI KAISHA, Toyota-shi, Aichi-ken (JP)

(72) Inventor: Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/419,603

(22) PCT Filed: Nov. 5, 2012

(86) PCT No.: PCT/JP2012/078604
§ 371 (c)(1),
(2) Date: Feb. 4, 2015

(87) PCT Pub. No.: WO2014/068782
PCT Pub. Date: May 8, 2014

(65) Prior Publication Data
US 2015/0224889 A1    Aug. 13, 2015

(51) Int. Cl.
| | |
|---|---|
| *B60L 9/00* | (2006.01) |
| *H02J 7/00* | (2006.01) |
| *B60L 11/18* | (2006.01) |
(Continued)

(52) U.S. Cl.
CPC ............ *B60L 11/1842* (2013.01); *B60L 11/12* (2013.01); *B60L 11/184* (2013.01); *B60L 11/1814* (2013.01); *B60L 11/1816* (2013.01); *B60L 11/1861* (2013.01); *B60W 20/00* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01); *Y10S 903/903* (2013.01)

(58) Field of Classification Search
USPC ............................................. 701/22; 320/109
See application file for complete search history.

(56) References Cited

U.S. PATENT DOCUMENTS

| | | | |
|---|---|---|---|
| 5,389,825 A * | 2/1995 | Ishikawa ............... | B60L 11/123 180/65.8 |
| 2006/0113129 A1* | 6/2006 | Tabata .................. | B60K 6/365 180/65.25 |
| 2008/0051949 A1* | 2/2008 | Seo ......................... | B60K 6/46 701/22 |

(Continued)

FOREIGN PATENT DOCUMENTS

| | | |
|---|---|---|
| JP | 2002-315193 A | 10/2002 |
| JP | 2010-148283 A | 7/2010 |

(Continued)

*Primary Examiner* — Thomas G Black
*Assistant Examiner* — Tyler Paige
(74) *Attorney, Agent, or Firm* — Oliff PLC

(57) ABSTRACT

An ECU is mounted on a vehicle that is able to carry out external charging for charging an in-vehicle battery with electric power from an outside of the vehicle and external discharging for discharging electric power inside the vehicle to the outside of the vehicle. The ECU sets a control mode of the vehicle to any one of a charging mode for carrying out the external charging, a discharging mode for carrying out the external discharging, and a traveling mode for propelling the vehicle. The ECU determines which one of the charging mode and the discharging mode is given a higher priority in accordance with a state of the vehicle when a user has carried out operation to require the external discharging during the charging mode or when the user has carried out operation to require the external charging during the discharging mode.

8 Claims, 3 Drawing Sheets

(51) Int. Cl.
*B60W 20/00* (2016.01)
*B60L 11/12* (2006.01)

(56) References Cited

U.S. PATENT DOCUMENTS

| | | | |
|---|---|---|---|
| 2010/0244782 A1* | 9/2010 | Nagayama | B60L 11/1868 320/162 |
| 2011/0282513 A1 | 11/2011 | Son et al. | |
| 2012/0010769 A1* | 1/2012 | Sourioux | B60K 6/48 701/22 |
| 2012/0095612 A1* | 4/2012 | Rivers, Jr. | H02J 3/14 700/297 |
| 2012/0187900 A1 | 7/2012 | Murawaka | |
| 2012/0193983 A1 | 8/2012 | Yukizane et al. | |
| 2012/0221185 A1* | 8/2012 | Yamazaki | B60K 6/445 701/22 |
| 2013/0106350 A1* | 5/2013 | Ono | H01M 10/44 320/109 |
| 2014/0167691 A1* | 6/2014 | Kamaga | B60L 11/1838 320/109 |

FOREIGN PATENT DOCUMENTS

| | | |
|---|---|---|
| JP | 2011-055589 A | 3/2011 |
| JP | 2011244682 A | 12/2011 |
| JP | 2012-120295 A | 6/2012 |
| WO | 2011045925 A1 | 4/2011 |

\* cited by examiner

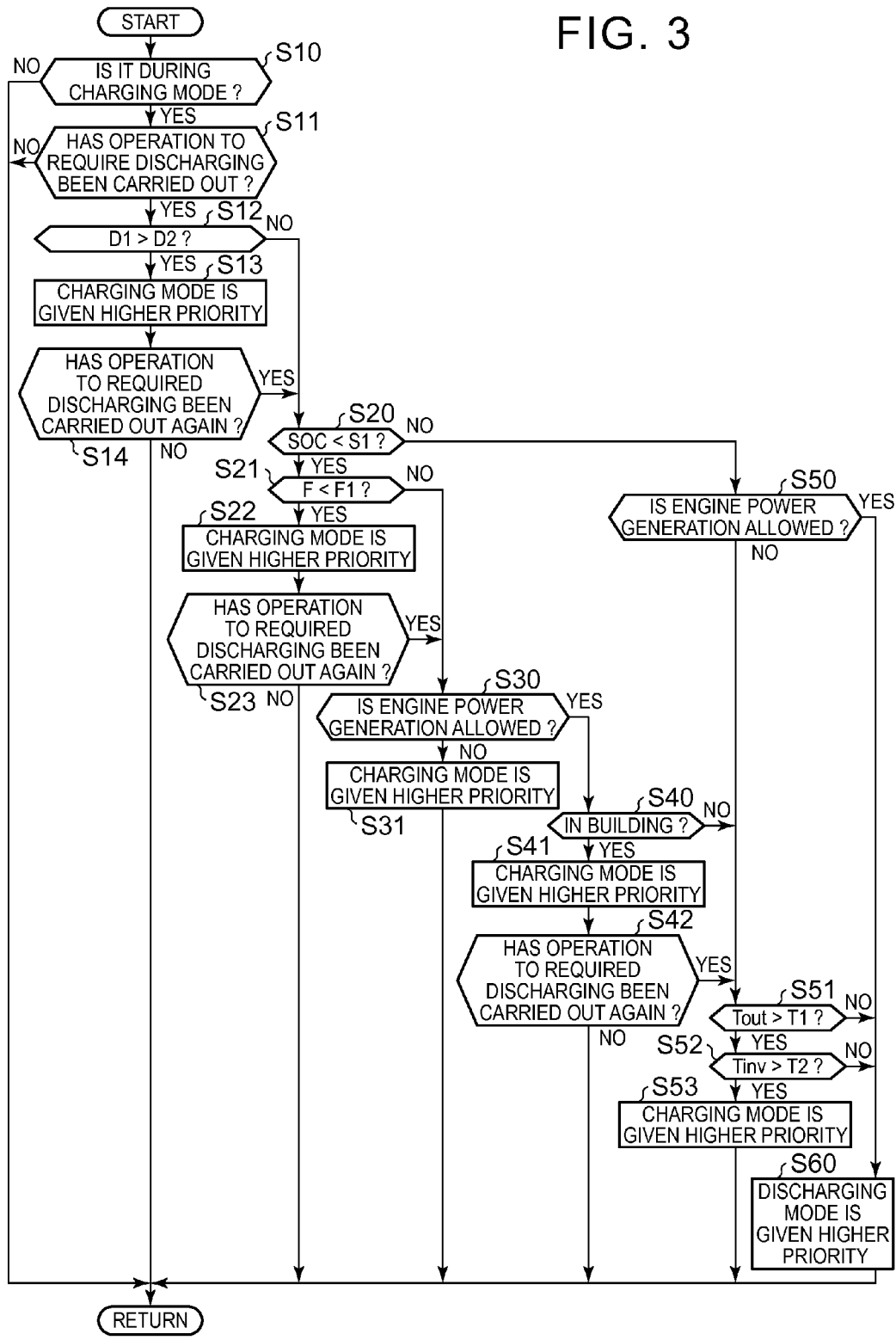

VEHICLE

TECHNICAL FIELD

The invention relates to a vehicle that is able to receive electric power from an outside and supply electric power to the outside.

BACKGROUND ART

Japanese Patent Application Publication No. 2011-244682 (Patent Document 1) describes a technique for, in a vehicle that is able to execute control for charging an in-vehicle battery with electric power from an outside of the vehicle (hereinafter, referred to as "external charging") or execute control for discharging electric power from the in-vehicle battery to the outside of the vehicle (hereinafter, referred to as "external discharging"), automatically carrying out external charging or external discharging in accordance with an operation mode of the vehicle and an electricity price. Specifically, in the case where the operation mode of the vehicle is a first mode, the vehicle described in Patent Document 1 automatically carries out external charging when the electricity price is lower than a charge reference price. On the other hand, in the case where the operation mode of the vehicle is a second mode in which the vehicle is not operated for a while, the vehicle described in Patent Document 1 automatically carries out external charging when an actual electricity price is lower than a discharge reference price, and automatically carries out external discharging when the electricity price is higher than the discharge reference price.

RELATED ART DOCUMENT

Patent Document

Patent Document 1: Japanese Patent Application Publication No. 2011-244682 (JP 2011-244682 A)

SUMMARY OF THE INVENTION

Problem to be Solved by the Invention

As described above, Patent Document 1 describes that external charging or external discharging is automatically carried out in accordance with the operation mode of the vehicle and the electricity price.

However, Patent Document 1 describes nothing about which one of external charging and external discharging is given a higher priority in the case where the external charging and the external discharging contend with each other. Therefore, for example, if a user carries out operation to require external discharging during external charging, discharging is started irrespective of a vehicle state.

The invention is contemplated to solve the above-described problem, and it is an object of the invention to make it possible to change between an external power receiving mode and an external power supply mode.

Means for Solving the Problem

A vehicle according to the invention is able to select one of an external power receiving mode for carrying out external power receiving for receiving electric power from an outside and an external power supply mode for carrying out external power supply for supplying electric power to the outside. The vehicle includes: a determination unit that determines at least one of whether operation to require the external power supply has been carried out by a user or whether operation to require the external power receiving has been carried out by the user; and a control unit that, when operation to require the external power supply has been carried out during the external power receiving mode or when operation to require the external power receiving has been carried out during the external power supply mode, determines which one of the external power receiving mode and the external power supply mode is given a higher priority in accordance with a state of the vehicle.

Preferably, the vehicle further includes an informing device that informs the user of a result determined by the control unit.

Preferably, the vehicle further includes an electrical storage device and a motor that is able to generate vehicle driving force by using electric power of the electrical storage device. The control unit gives a higher priority to the external power supply mode when a state of charge of the electrical storage device is higher than a predetermined level, and gives a higher priority to the external power receiving mode when the state of charge of the electrical storage device is lower than the predetermined level.

Preferably, the vehicle further includes an engine that generates power by using combustion energy of fuel, and a generator that is able to generate electric power by using the power of the engine. The control unit gives a higher priority to the external power supply mode when a fuel remaining level of the engine is higher than a predetermined level, and gives a higher priority to the external power receiving mode when the fuel remaining level of the engine is lower than the predetermined level.

Preferably, the vehicle further includes an electrical storage device and a converter that converts electric power of the electrical storage device to electric power with which the external power supply can be carried out. The control unit gives a higher priority to the external power supply mode when an outside air temperature is lower than a first temperature or when a temperature of the converter is lower than a second temperature, and gives a higher priority to the external power receiving mode when the outside air temperature is higher than the first temperature and the temperature of the converter is higher than the second temperature.

Preferably, the control unit gives a higher priority to the external power supply mode when a first distance from a position of the vehicle to a destination is shorter than a second distance that the vehicle can travel, and gives a higher priority to the external power receiving mode when the first distance is longer than the second distance.

Preferably, when operation to require the external power supply has been carried out after it is determined to give a higher priority to the external power receiving mode, the control unit redetermines which one of the external power receiving mode and the external power supply mode is given a higher priority.

Preferably, when the control unit redetermines which one of the external power receiving mode and the external power supply mode is given a higher priority, the control unit makes it easy to give a higher priority to the external power supply mode as compared to before the control unit redetermines which one of the external power receiving mode and the external power supply mode is given a higher priority.

Effect of the Invention

According to the invention, it is possible to change between the external power receiving mode and the external power supply mode at the time when user's operation (operation to require external power supply or operation to require external power receiving) has been carried out.

BRIEF DESCRIPTION OF THE DRAWINGS

FIG. 3 is a flowchart that shows an example of a procedure of the ECU.

MODES FOR CARRYING OUT THE INVENTION

Figure 1:
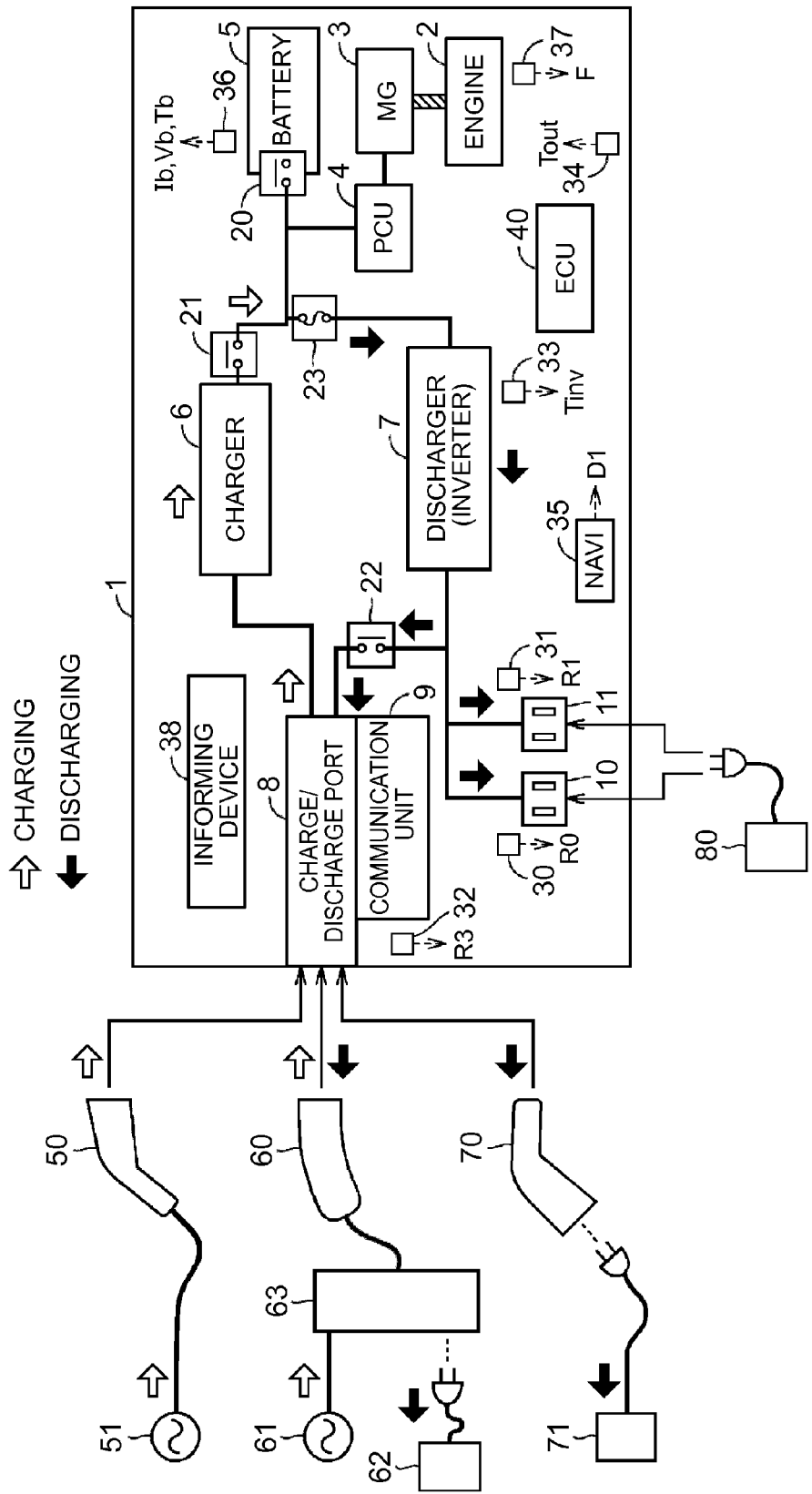
FIG. 1 is an overall block diagram of a vehicle.

Hereinafter, an embodiment of the invention will be described with reference to the accompanying drawings. In the following description, like reference numerals denote the same components. Names and functions of them are also the same. Thus, the detailed description thereof will not be repeated.

FIG. 1 is an overall block diagram of a vehicle 1 according to the present embodiment. The vehicle 1 includes an engine 2, a motor generator (MG) 3, a power control unit (PCU) 4, a battery 5 and an electronic control unit (ECU) 40.

The vehicle 1 is a hybrid vehicle that is able to travel by using power of at least one of the engine 2 or the MG 3. A vehicle to which the invention is applicable is not necessarily limited to a hybrid vehicle as long as the vehicle is able to exchange electric power with an outside of the vehicle, and may be, for example, an electric vehicle.

The engine 2 is an internal combustion engine that generates power by using combustion energy of fuel.
The MG 3 is an alternating-current rotary electric machine. The MG 3 generates vehicle driving force by using electric power stored in the battery 5. The MG 3 is able to generate electric power by using the power of the engine 2. In the present embodiment, the power of the engine 2 is used as not only power for generating electric power but also vehicle driving force.

The battery 5 is a rechargeable direct-current electrical storage device, and is, for example, formed by including nickel-metal hydride, lithium ions, or the like.

The PCU 4 converts electric power between the battery 5 and the MG 3 on the basis of a control signal from the ECU 40. That is, the PCU 4 converts direct current, supplied from the battery 5, to alternating current and then outputs the alternating current to the MG 3, or converts alternating current, generated by the MG 3, to direct current and then outputs the direct current to the battery 5.

The vehicle 1 is able to carry out external charging (external power receiving) for charging the battery 5 with electric power from the outside of the vehicle (hereinafter, referred to as "external electric power") or carry out external discharging (external power supply) for supplying the outside of the vehicle with electric power generated by the MG3 by using electric power stored in the battery 5 or power of the engine 2 (hereinafter, also referred to as "internal electric power"). The vehicle 1 includes a charger 6, a discharger 7, a charge/discharge port 8, a communication unit 9 and alternating-current receptacles 10, 11 as devices for carrying out external charging and external discharging.

The charge/discharge port 8 is a power interface for exchanging electric power with the outside of the vehicle. The charge/discharge port 8 is formed so as to allow connectors 50, 60, 70 to be connected from the outside of a vehicle cabin.

The connector 50 is a connector for carrying out external charging with electric power from a system power supply 51. When a user connects the connector 50 to the charge/discharge port 8, external charging is allowed to be carried out with electric power from the system power supply 51 connected to the connector 50.

The connector 60 is a connector for carrying out external charging with electric power from the system power supply 51 via a home energy management system (hereinafter, referred to as "HEMS") 63 or carrying out external discharging to an electrical load 62. When the user connects the connector 60 to the charge/discharge port 8, it is possible to carry out external charging with electric power from the system power supply 51 connected to the HEMS 63 or carry out external discharging to the electrical load 62 connected to the HEMS 63.

When the connector 60 is connected to the charge/discharge port 8, the communication unit 9 carries out digital communication (for example, in-band communication) with the HEMS 63 on the basis of a control signal from the ECU 40.

The connector 70 is a connector for carrying out external discharging through direct connection to the electrical load 71 outside the vehicle (without intervening the HEMS 63). When the user connects the electrical load 71 to the connector 70 and connects the connector 70 to the charge/discharge port 8, it is possible to carry out external discharging to the electrical load 71.

The alternating-current receptacles 10, 11 are respectively provided at mutually different positions inside the vehicle cabin. For example, the alternating-current receptacle 10 is provided near a center console, and the alternating-current receptacle 11 is provided near a luggage space. When the user connects a plug of the electrical load 80 to the alternating-current receptacle 10 or the alternating-current receptacle 11, it is possible to carry out external discharging to the electrical load 80.

The charger 6 is provided between the charge/discharge port 8 and the battery 5. The charger 6 converts external electric power, input to the charge/discharge port 8, to electric power with which the battery 5 is chargeable and then outputs the converted electric power to the battery 5 on the basis of a control signal from the ECU 40. Thus, external charging is carried out.

The discharger (inverter) 7 is provided in parallel with the charger 6 between the charge/discharge port 8 and the battery 5. The discharger 7 converts internal electric power to electric power that is usable outside the vehicle (for example, alternating current 100 volts) and then outputs the converted electric power to the charge/discharge port 8 on the basis of a control signal from the ECU 40. Thus, external discharging is carried out.

The battery 5 and the PCU 4 are connected to each other via a system main relay 20. The battery 5 and the charger 6 are connected to each other via the system main relay 20 and a charging relay 21. The battery 5 and the discharger 7 are connected to each other via the system main relay 20 and a fuse 23. The discharger 7 and the charge/discharge port 8 are connected to each other via a discharging relay 22.

The vehicle 1 further includes switches 30, 31, 32, temperature sensors 33, 34, a navigation system 35, a monitoring sensor 36, a fuel sensor 37 and an informing device 38.

The switch 30 is a switch for the user to require external discharging with the use of the alternating-current receptacle 10. When operation to require external discharging is input by the user, the switch 30 outputs a signal R0 indicating that effect to the ECU 40.

The switch 31 is a switch for the user to require external discharging with the use of the alternating-current receptacle 11. When operation to require external discharging is input by the user, the switch 31 outputs a signal R1 indicating that effect to the ECU 40.

The switch 32 is a switch for the user to require external discharging with the use of the connector 70. When operation to require external discharging is input by the user, the switch 32 outputs a signal R3 indicating that effect to the ECU 40. The switch 32 may be provided not on the vehicle 1 but on the connector 70.

The temperature sensor 33 detects the temperature of the discharger 7 (hereinafter, referred to as "discharger temperature Tinv"). The temperature sensor 34 detects the temperature of air outside the vehicle cabin (hereinafter, referred to as "outside air temperature Tout"). The monitoring sensor 36 detects the state (a battery current Ib, a battery voltage Vb, a battery temperature Tb) of the battery 5. The fuel sensor 37 detects the remaining level of fuel (hereinafter, referred to as "fuel remaining level F") that is consumed in the engine 2. These sensors output detected results to the ECU 40.

The navigation system 35 acquires the current position of the vehicle 1 by utilizing, for example, a global positioning system (GPS). The navigation system 35 further sets a required travel distance D1 of the vehicle 1 by consulting information set by the user and map information stored in a memory. For example, when a destination is set, the required travel distance D1 is set to a travel distance from the current position to the destination. When no destination is set but user's home is set, the required travel distance D1 is set to a travel distance from the current position to the user's home. When neither a destination nor a home is set, the required travel distance D1 is set to a predetermined distance.

The informing device 38 informs the user of various pieces of information through video or voice on the basis of a control signal from the ECU 40.

The ECU 40 incorporates an arithmetic operation unit (not shown) and a memory (not shown), and executes predetermined arithmetic processing on the basis of information stored in the memory and information from the sensors. The ECU 40 monitors or controls the state of each device of the vehicle 1 on the basis of the result of arithmetic processing.

The ECU 40 calculates the state of charge (hereinafter, referred to as "SOC") of the battery 5 on the basis of a detected result of the monitoring sensor 36. The ECU 40 calculates a distance that the vehicle 1 is allowed to travel (hereinafter, referred to as "available travel distance D2") on the basis of the SOC and the fuel remaining level F.

When external charging is carried out, the ECU 40 closes the system main relay 20 and the charging relay 21, and activates the charger 6. Thus, the battery 5 is charged with external electric power (see the outlined arrows in FIG. 1).

When external discharging is carried out with the use of the charge/discharge port 8, the ECU 40 closes the system main relay 20 and the discharging relay 22, and activates the discharger 7. When external discharging is carried out with the use of the alternating-current receptacles 10, 11, the ECU 40 closes the system main relay 20, and activates the discharger 7. Thus, internal electric power is supplied to the outside of the vehicle (see the solid arrows in FIG. 1).

The ECU 40 sets a mode for controlling each device of the vehicle 1 (hereinafter, referred to as "control mode") to any one of a mode for carrying out external charging (hereinafter, referred to as "charging mode"), a mode for carrying out external discharging (hereinafter, referred to as "discharging mode"), and a mode for propelling the vehicle 1 (hereinafter, referred to as "traveling mode"). During the traveling mode, not only it is possible to drive the MG 3 with electric power of the battery 5 but also it is possible to charge the battery 5 with electric power generated by the MG 3.

Figure 2:
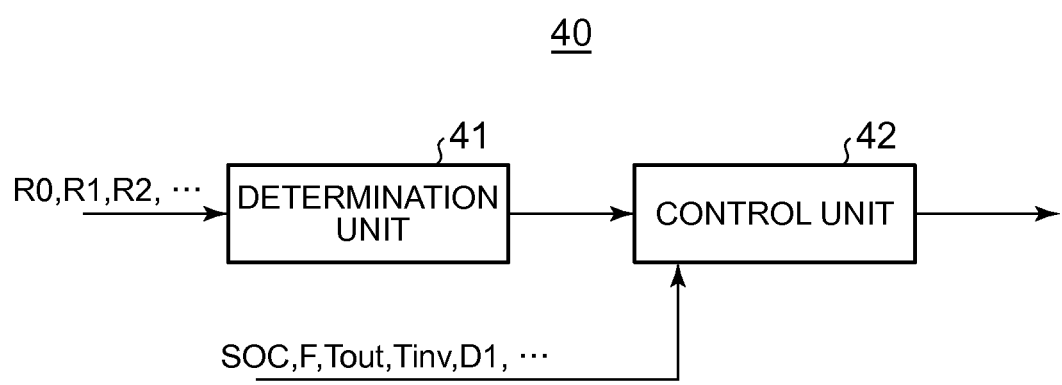
FIG. 2 is a functional block diagram of an ECU.

FIG. 2 is a functional block diagram of the ECU 40 in setting the control mode. The ECU 40 includes a determination unit 41 and a control unit 42. The determination unit 41 and the control unit 42 may be implemented by hardware or may be implemented by software.

The determination unit 41 determines whether the user has carried out operation to require external charging, and determines whether the user has carried out operation to require external discharging.

When at least one of the following condition A or the following condition B is satisfied, the determination unit 41 determines that the user has carried out operation to require external charging.

(Condition A) The connector 50 is connected to the charge/discharge port 8.

(Condition B) The connector 60 is connected to the charge/discharge port 8, and an external charging command has been received from the HEMS 63.

When at least any one of the following conditions C to F is satisfied, the determination unit 41 determines that the user has carried out operation to require external discharging.

(Condition C) The connector 60 is connected to the charge/discharge port 8, and an external discharging command has been received from the HEMS 63.

(Condition D) The connector 70 is connected to the charge/discharge port 8, and the signal R3 from the switch 32 has been received.

(Condition E) The signal R0 from the switch 30 has been received.

(Condition F) The signal R1 from the switch 31 has been received.

When none of the above-described conditions A to F is satisfied, the determination unit 41 determines that the user has not carried out operation to require external charging or has not carried out operation to require external discharging.

The above-described conditions A to F are only one example, and the configuration is not limited to these conditions. Where necessary, the determination unit 41 may determine at least one of whether there is operation to require external charging or whether there is operation to require external discharging.

The control unit 42 sets the control mode on the basis of the result determined by the determination unit 41. When it is determined that the user has carried out operation to require external charging, the control unit 42 sets the control mode to the charging mode. When it is determined that the user has carried out operation to require external discharging, the control unit 42 sets the control mode to the discharging mode. When it is determined that the user has not carried out operation to require external charging or operation to require external discharging, the control unit 42 sets the control mode to the traveling mode.

In addition, when the user has carried out operation to require external discharging during the charging mode or when the user has carried out operation to require external charging during the discharging mode, the control unit 42 according to the present embodiment determines which one of the charging mode and the discharging mode is given a higher priority in accordance with the state (the SOC, the fuel remaining level F, the outside air temperature Tout, the discharger temperature Tinv, the required travel distance D1, and the like) of the vehicle 1 at the time when the user's operation has been carried out. The control unit 42 informs the user of the determined result with the use of the informing device 38.

Hereinafter, a method in which the control unit 42 determines which one of the charging mode and the discharging mode is given a higher priority will be described.

The available travel distance D2 depends on the SOC and the fuel remaining level F. Therefore, when the SOC is lower than a predetermined level S1, it is desirable to reserve the available travel distance D2 by a larger amount by giving a higher priority to external charging than to external discharging. Therefore, the control unit 42 gives a higher priority to the charging mode when a condition that the SOC is lower than the predetermined level S1 (hereinafter, also referred to as "first condition") is satisfied; otherwise, the control unit 42 gives a higher priority to the discharging mode.

When the fuel remaining level F is lower than a predetermined level F1 as well, it is desirable to reserve the available travel distance D2 by a larger amount by giving a higher priority to external charging than to external discharging. Therefore, when a condition that the fuel remaining level F is lower than the predetermined level F1 (hereinafter, also referred to as "second condition") is satisfied, the control unit 42 gives a higher priority to the charging mode; otherwise, the control unit 42 gives a higher priority to the discharging mode. At this time, the control unit 42 controls the informing device 38 to inform the user that the fuel remaining level F is low and there is a possibility that the vehicle becomes not allowed to travel. After informing the user, when the user has carried out operation to require external discharging, the control unit 42 gives a higher priority to the discharging mode in accordance with the user's request.

When the outside air temperature Tout is higher than a predetermined temperature T1 and the discharger temperature Tinv is higher than a predetermined temperature T2, there is a possibility that the discharger 7 is overheated and is not able to normally carry out external discharging. Therefore, when a condition that the outside air temperature Tout is higher than the predetermined temperature T1 and the discharger temperature Tinv is higher than the predetermined temperature T2 (hereinafter, also referred to as "third condition") is satisfied, the control unit 42 gives a higher priority to the charging mode; otherwise, the control unit 42 gives a higher priority to the discharging mode. When the discharger temperature Tinv has decreased below the predetermined temperature T2 after the charging mode is given a higher priority, the discharging mode may be given a higher priority.

When the required travel distance D1 is longer than the available travel distance D2, it is desirable to increase the available travel distance D2 through external charging. Therefore, when a condition that the required travel distance D1 is longer than the available travel distance D2 (hereinafter, also referred to as "fourth condition") is satisfied, the control unit 42 gives a higher priority to the charging mode; otherwise, the control unit 42 gives a higher priority to the discharging mode. At this time, the control unit 42 controls the informing device 38 to inform the user of the fact that electric power and fuel that are required to move to the destination or the home are insufficient. After informing the user, when the user has carried out operation to require external discharging, the control unit 42 gives a higher priority to the discharging mode in accordance with the user's request.

When the vehicle 1 is located in a building (for example, when the vehicle 1 is parked in a garage in the home, in a site of the home, or the like), there is a high possibility that electric power of the system power supply in the building is usable even without using internal electric power of the vehicle 1. Therefore, when a condition that the vehicle 1 is located in a building (hereinafter, also referred to as "fifth condition") is satisfied, the control unit 42 gives a higher priority to the charging mode; otherwise, the control unit 42 gives a higher priority to the discharging mode.

When it is not possible to generate electric power with the MG 3 by using the power of the engine 2 (hereinafter, also referred to as "engine power generation"), it is desirable to reserve the available travel distance D2 by a larger amount through external charging. Therefore, when a condition that it is not allowed to carry out engine power generation (hereinafter, also referred to as "sixth condition") is satisfied, the control unit 42 gives a higher priority to the charging mode; otherwise, the control unit 42 gives a higher priority to the discharging mode.

As long as there is no technical contradiction, it is possible to combine any two or more conditions among the above-described first to sixth conditions as needed where necessary.

FIG. 3 is a flowchart that shows an example of a procedure of the ECU 40 (control unit 42) in the case where the above-described first to sixth conditions are combined. FIG. 3 illustrates a process in the case where the user has carried out operation to require external discharging during the charging mode; however, a similar process is executed in the other case (in the case where the user has carried out operation to require external charging during the discharging mode).

In step (hereinafter, step is abbreviated as "S") 10, the ECU 40 determines whether it is during the charging mode. When it is during the charging mode (YES in S10), the ECU 40 proceeds with the process to S11. Otherwise (NO in S10), the ECU 40 ends the process.

In S11, the ECU 40 determines whether operation to require external discharging has been carried out. When operation to require external discharging has been carried out (YES in S11), the ECU 40 proceeds with the process to S12. Otherwise (NO in S11), the ECU 40 ends the process.

In S12, the ECU 40 determines whether the required travel distance D1 is longer than the available travel distance D2. When the required travel distance D1 is longer than the available travel distance D2 (YES in S12), the ECU 40 proceeds with the process to S13. Otherwise (NO in S12), the ECU 40 proceeds with the process to S20.

In S13, the ECU 40 gives a higher priority to the charging mode, and sets the control mode to the charging mode. At this time, the ECU 40 uses the informing device 38 to inform the user of the fact that the charging mode is given a higher priority. In addition, the ECU 40 uses the informing device 38 to inform the user of the fact that electric power and fuel that are required to move to the destination or the home are insufficient, and makes the user to determine whether external discharging is still required.

After that, the ECU 40 determines in S14 whether operation to require external discharging has been carried out again. When operation to require external discharging has been carried out again (YES in S14), the ECU 40 proceeds with the process to S20 in order to redetermine which one of the charging mode and the discharging mode is given a higher priority. At this time, the reason why the process is caused not to return to S12 but to proceed to S20 is to make it easy to give a higher priority to the discharging mode along with the user's request. On the other hand, when operation to require external discharging has not been carried out again (NO in S14), the ECU 40 ends the process.

In S20, the ECU 40 determines whether the SOC is lower than the predetermined level S1. When the SOC is lower than the predetermined level S1 (YES in S20), the ECU 40 proceeds with the process to S21. Otherwise (NO in S20), the ECU 40 proceeds with the process to S50.

In S21, the ECU 40 determines whether the fuel remaining level F is lower than the predetermined level F1. When the fuel remaining level F is lower than the predetermined level F1 (YES in S21), the ECU 40 proceeds with the process to S22. Otherwise (NO in S21), the ECU 40 proceeds with the process to S30.

In S22, the ECU 40 gives a higher priority to the charging mode, and sets the control mode to the charging mode. At this time, the ECU 40 uses the informing device 38 to inform the user of the fact that the charging mode is given a higher priority. In addition, the ECU 40 uses the informing device 38 to inform the user that the fuel remaining level F is low and there is a possibility that the vehicle becomes not allowed to travel, and makes the user to determine whether external discharging is still required.

After that, the ECU 40 determines in S23 whether operation to require external discharging has been carried out. When operation to require external discharging has been carried out again (YES in S23), the ECU 40 proceeds with the process to S30 in order to redetermine which one of the charging mode and the discharging mode is given a higher priority. At this time, the reason why the process is caused not to return to S20 but to proceed to S30 is to make it easy to give a higher priority to the discharging mode along with the user's request. On the other hand, when operation to require external discharging has not been carried out again (NO in S23), the ECU 40 ends the process.

In S30, the ECU 40 determines whether it is allowed to carry out engine power generation. When it is allowed to carry out engine power generation (YES in S30), the ECU 40 proceeds with the process to S40. When it is not allowed to carry out engine power generation (NO in S30), the ECU 40 proceeds with the process to S31.

In S31, the ECU 40 gives a higher priority to the charging mode, and sets the control mode to the charging mode. At this time, the ECU 40 uses the informing device 38 to inform the user of the fact that the charging mode is given a higher priority.

In S40, the ECU 40 determines whether the vehicle 1 is located in a building. When the vehicle 1 is located in a building (YES in S40), the ECU 40 proceeds with the process to S41. Otherwise (NO in S40), the ECU 40 proceeds with the process to S51.

In S41, the ECU 40 gives a higher priority to the charging mode, and sets the control mode to the charging mode. At this time, the ECU 40 uses the informing device 38 to inform the user of the fact that the charging mode is given a higher priority. In addition, the ECU 40 uses the informing device 38 to make the user to determine whether external discharging is still required.

After that, the ECU 40 determines in S42 whether operation to require external discharging has been carried out again. When operation to require external discharging has been carried out again (YES in S42), the ECU 40 proceeds with the process to S51 in order to redetermine which one of the charging mode and the discharging mode is given a higher priority. At this time, the reason why the process is caused not to return to S40 but to proceed to S51 is to make it easy to give a higher priority to the discharging mode along with the user's request. On the other hand, when operation to require external discharging has not been carried out again (NO in S42), the ECU 40 ends the process.

In S50, the ECU 40 determines whether it is allowed to carry out engine power generation. When it is allowed to carry out engine power generation (YES in S50), the ECU 40 proceeds with the process to S60. When it is not allowed to carry out engine power generation (NO in S50), the ECU 40 proceeds with the process to S51.

In S51, the ECU 40 determines whether the outside air temperature Tout is higher than the predetermined temperature T1. When the outside air temperature Tout is higher than the predetermined temperature T1 (YES in S51), the ECU 40 proceeds with the process to S52. Otherwise (NO in S51), the ECU 40 proceeds with the process to S60.

In S52, the ECU 40 determines whether the discharger temperature Tinv is higher than the predetermined temperature T2. When the discharger temperature Tinv is higher than the predetermined temperature T2 (YES in S52), the ECU 40 proceeds with the process to S53. Otherwise (NO in S52), the ECU 40 proceeds with the process to S60.

In S53, the ECU 40 gives a higher priority to the charging mode, and sets the control mode to the charging mode. At this time, the ECU 40 uses the informing device 38 to inform the user of the fact that the charging mode is given a higher priority.

In S60, the ECU 40 gives a higher priority to the discharging mode, and sets the control mode to the discharging mode. At this time, the ECU 40 uses the informing device 38 to inform the user of the fact that the discharging mode is given a higher priority.

As described above, when operation to require external discharging has been carried out during the charging mode or when operation to require external charging has been carried out during the discharging mode, the ECU 40 according to the present embodiment determines which one of the charging mode and the discharging mode is given a higher priority in accordance with the vehicle state, and sets the mode given a higher priority for the control mode. Therefore, for example, even when operation to require external discharging has been carried out during the charging mode, it is possible to change the control mode from the charging mode to the discharging mode depending on the vehicle state. Even when operation to require external charging has been carried out during the discharging mode, it is also possible to change the control mode from the discharging mode to the charging mode depending on the vehicle state.

In addition, the ECU 40 according to the present embodiment determines which one of the charging mode and the discharging mode is given a higher priority at the time when user's operation (operation to require external discharging or operation to require external charging) has been carried out, and informs the user of the determined result. Therefore, the user is able to be informed of for which one of external charging and external discharging the current vehicle state is suitable by being informed of the determined result after the user's operation.

The embodiment described above is illustrative and not restrictive in all respects. The scope of the invention is defined by the appended claims rather than the above description. The scope of the invention is intended to encompass all modifications within the scope of the appended claims and equivalents thereof.

DESCRIPTION OF REFERENCE NUMERALS

1 vehicle, 2 engine, 3 MG, 4 PCU, 5 battery, 6 charger, 7 discharger, 8 charge/discharge port, 9 communication unit, 10, 11 alternating-current receptacle, 20 system main relay, 21 charging relay, 22 discharging relay, 23 fuse, 30, 31, 32 switch, 33, 34 temperature sensor, 35 navigation system, 36 monitoring sensor, 37 fuel sensor, 38 informing device, 40 ECU, 41 determination unit, 42 control unit, 50, 60, 70 connector, 51 system power supply, 62, 71, 80 electrical load

What is claimed is:

1. A vehicle comprising:
an electronic control unit (ECU) configured to
(a) select one of an external power receiving mode and an external power supply mode, the external power receiving mode being a mode in which external power receiving is carried out for receiving electric power from an outside of the vehicle, the external power supply mode being a mode in which external power supply is carried out for supplying electric power to the outside of the vehicle,
(b) determine at least one of whether operation to require the external power supply has been carried out by a user or whether operation to require the external power receiving has been carried out by the user, and
(c) determine based on a state of the vehicle which one of the external power receiving mode and the external power supply mode is given a higher priority, when the ECU determines that the operation to require the external power supply has been carried out while the external power receiving mode is selected or when the ECU determines that the operation to require the external power receiving has been carried out while the external power supply mode is selected.

2. The vehicle according to claim 1, further comprising:
an informing device configured to inform the user of a result determined by the ECU.

3. The vehicle according to claim 1, further comprising:
an electrical storage device; and
a motor configured to generate driving force of the vehicle by using electric power of the electrical storage device, wherein
the ECU is configured to
give a higher priority to the external power supply mode when a state of charge of the electrical storage device is higher than a predetermined level, and
give a higher priority to the external power receiving mode when the state of charge of the electrical storage device is lower than the predetermined level.

4. The vehicle according to claim 1, further comprising:
an engine configured to generate power by using combustion energy of fuel; and
a generator configured to generate electric power by using the power of the engine, wherein
the ECU is configured to
give a higher priority to the external power supply mode when a fuel remaining level of the engine is higher than a predetermined level, and
give a higher priority to the external power receiving mode when the fuel remaining level of the engine is lower than the predetermined level.

5. The vehicle according to claim 1, further comprising:
an electrical storage device;
a converter configured to convert electric power of the electrical storage device to electric power with which the external power supply can be carried out;
a first temperature sensor configured to detect a temperature of the converter; and
a second temperature sensor configured to detect an outside air temperature, the outside air temperature being a temperature of air outside a cabin of the vehicle, wherein
the ECU is configured to
give a higher priority to the external power supply mode when the outside air temperature is lower than a first temperature or when the temperature of the converter is lower than a second temperature, and
give a higher priority to the external power receiving mode when the outside air temperature is higher than the first temperature and the temperature of the converter is higher than the second temperature.

6. The vehicle according to claim 1, further comprising:
a navigation system configured to set a first distance, the first distance being a distance from a current position of the vehicle to a destination, wherein
the ECU is configured to
calculate a second distance, the second distance being a distance that the vehicle can travel,
the ECU is configured to
give a higher priority to the external power supply mode when the first distance is shorter than or equal to the second distance, and
give a higher priority to the external power receiving mode when the first distance is longer than the second distance.

7. The vehicle according to claim 1, wherein
the ECU is configured to, when the ECU determines that the operation to require the external power supply has been carried out after the ECU has determined to give a higher priority to the external power receiving mode, redetermine which one of the external power receiving mode and the external power supply mode is given a higher priority.

8. The vehicle according to claim 7, wherein
the ECU is configured to redetermine which one of the external power receiving mode and the external power supply mode is given a higher priority based on a vehicle parameter different than a vehicle parameter based on which the ECU initially determined to give a higher priority to the external power receiving mode.

* * * * *